June 28, 1927.

F. W. BIRTCH

LIQUID HEATER

Filed Sept. 1, 1925

INVENTOR
Fred W. Birtch
By
Parker & Prochnow
ATTORNEYS

June 28, 1927.
F. W. BIRTCH
1,633,758
LIQUID HEATER
Filed Sept. 1, 1925
2 Sheets-Sheet 2
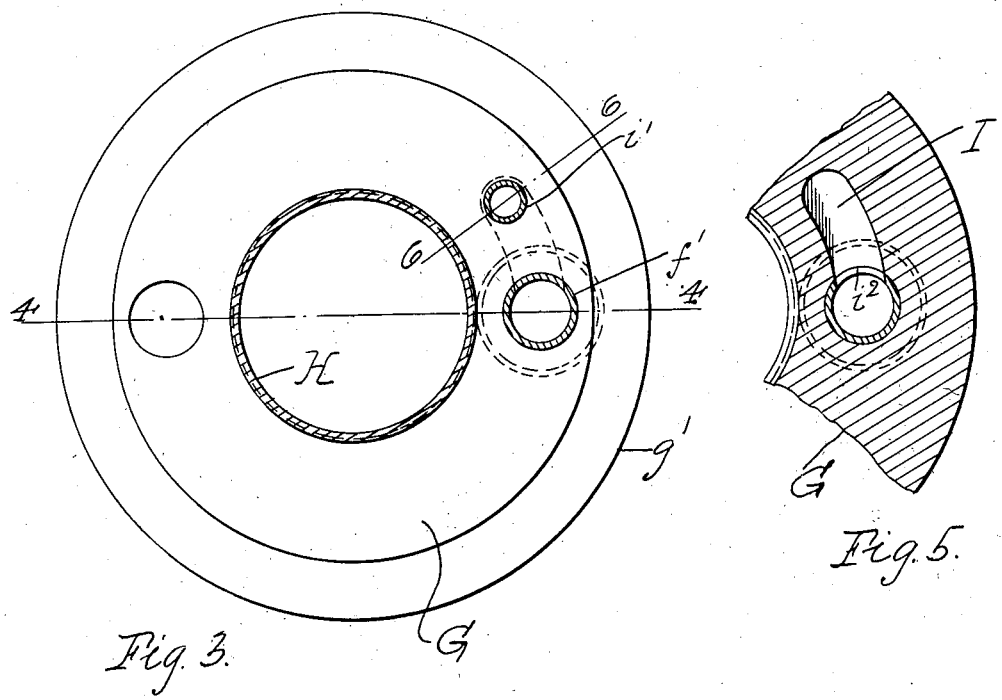
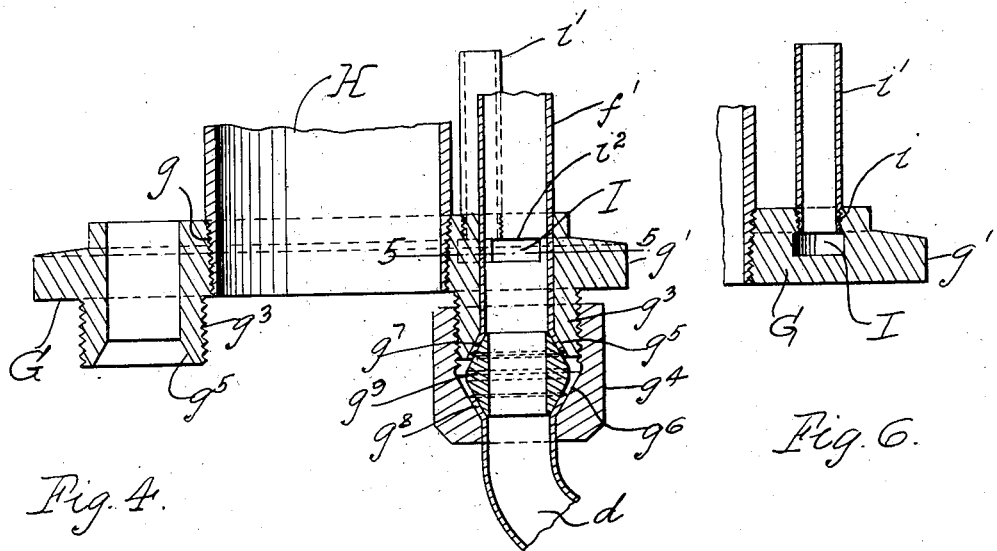
INVENTOR
Fred W. Birtch,
By Parker & Prochnow,
ATTORNEYS Patented June 28, 1927.

1,633,758

UNITED STATES PATENT OFFICE.

FRED W. BIRTCH, OF BUFFALO, NEW YORK, ASSIGNOR TO BIRTCH LABORATORIES INC., OF BUFFALO, NEW YORK.

LIQUID HEATER.

Application filed September 1, 1925. Serial No. 53,959.

This invention relates to improvements in water heaters which improvements may be, for example, applied to heaters of the kind which are commonly employed for heating water for domestic use.

In water heaters of this kind difficulty is invariably experienced due to the fact that material which is carried by the water either in solution or suspended therein is deposited when heat is applied to the water, and thus forms a scale, crust or deposit in the part of the heater to which the heat is directly applied. This scale is a poor conductor of heat and hence decreases greatly the efficiency of the heater and eventually damages or causes breaks in the portion of the heater to which the heat is applied, so that in water heaters as commonly made the coils to which the heat is applied and in which the water circulates while being heated must be renewed at regular intervals to maintain the efficiency of the heater and, if not renewed, breaks in the coils are apt to result.

The objects of this invention are to provide a water heater of this kind in which the deposit of foreign material which is precipitated from the water during the heating thereof will not form a scale, crust or layer in the portion of the heater to which the heat is applied, so that the efficiency of the heater will not be impaired by extended use thereof; also to provide a heater of this kind in which the heat is applied to a body of water which circulates in a substantially closed circuit and which in turn imparts its heat to another body of water; also to provide a water heater of this kind of improved construction which may be readily assembled or dismantled and in which the heating coil or circuit can be readily removed or replaced as a unit; also to improve water heaters of this kind in other respects hereinafter specified.

In the accompanying drawings,

Fig. 3 is a sectional plan view thereof, partly on line 3—3, Fig. 2, showing the supporting member of the heating circuit or coil removed from the heater, and on an enlarged scale.

Fig. 4 is a sectional elevation thereof on line 4—4, Fig. 3.

Fig. 5 is a fragmentary sectional view thereof on line 5—5, Fig. 4.

Fig. 6 is a fragmentary elevation thereof on line 6—6, Fig. 3.

The invention is shown in the accompanying drawings as applied to a water heater of the type commonly used in houses for supplying hot water for washing and analogous purposes, but it will be understood that it is not intended to limit this invention to use in connection with heaters of this kind, since the invention may be applied to water heaters of any other kind.

The heater includes a container for the water to be heated, such as a reservoir or tank A which may be of any suitable or desired shape, that shown being in the form of an upright cylinder, such as is commonly used in connection with domestic water heaters. The reservoir includes a cylindrical shell or wall $a$ provided with upper and lower headers $a'$, $a^2$ suitably secured to the side wall, the lower header being preferably arranged somewhat above the bottom of the cylindrical shell $a$. Water is admitted to the lower portion of the tank or reservoir A in any suitable manner, for example, by means of a pipe B extending through the upper header $a'$ and terminating in the lower portion of the reservoir A and the upper end of the pipe B may be provided with any suitable pipe connection $b$ for attachment to a water supply pipe (not shown). The hot water is withdrawn from the tank or reservoir A through a pipe connection $b'$ which is also arranged in the upper header $a'$. Other connections for supplying water to the reservoir and withdrawing water therefrom may be provided if desired. The sides and top of the heater are also preferably enveloped in heat insulating material, as is common practice to prevent dissipation of heat through the walls of the tank or reservoir, the insulation shown including a cylindrical shell C of any suitable material surrounding the cylindrical shell $a$ of the tank A, and a layer of insulation C' inclosing the top of the tank or reservoir A. The heater is preferably supported on suitable legs or standards c. All of these parts have heretofore been used in connection with water heaters and of themselves constitute no part of this invention.

Figure 1:
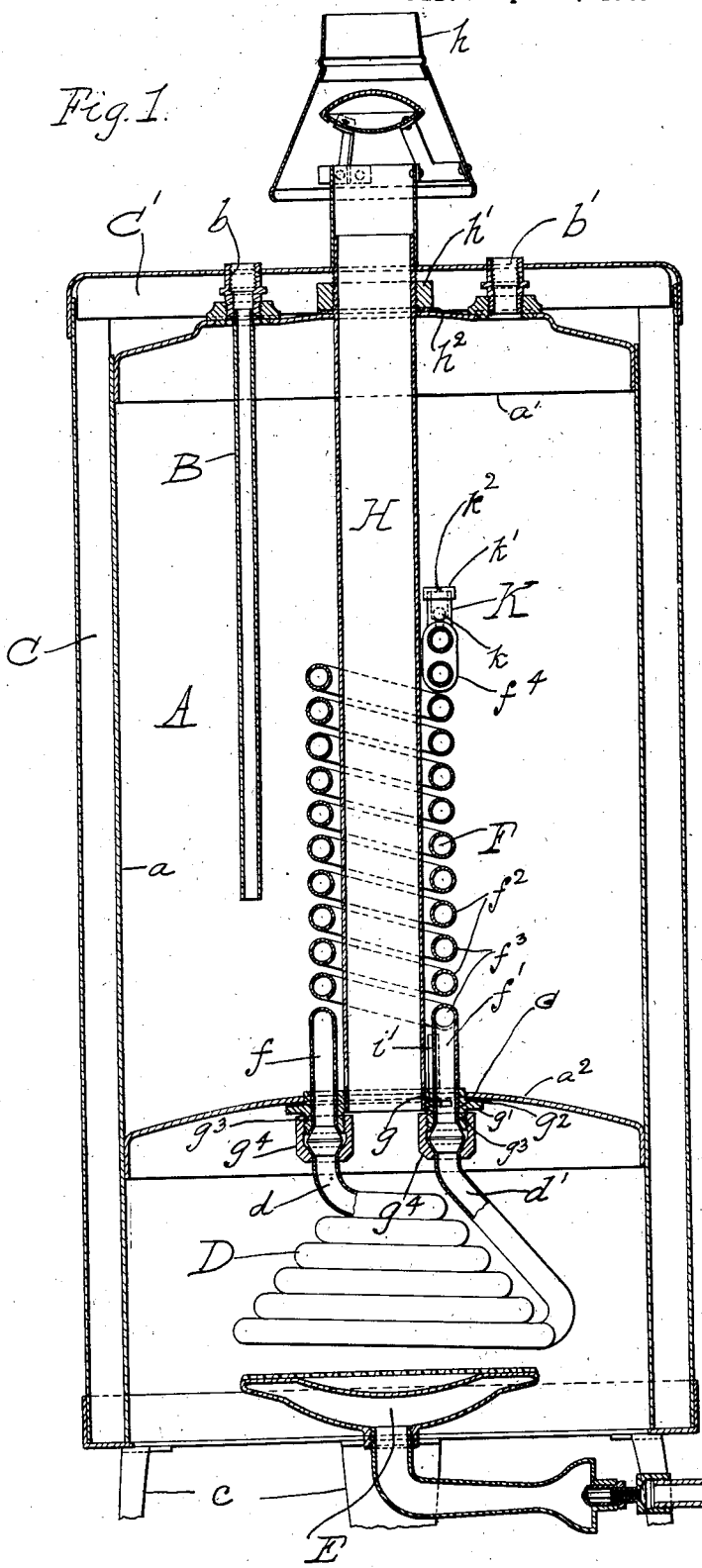
Fig. 1 is a central sectional elevation of a water heater embodying my invention.
Figure 2:
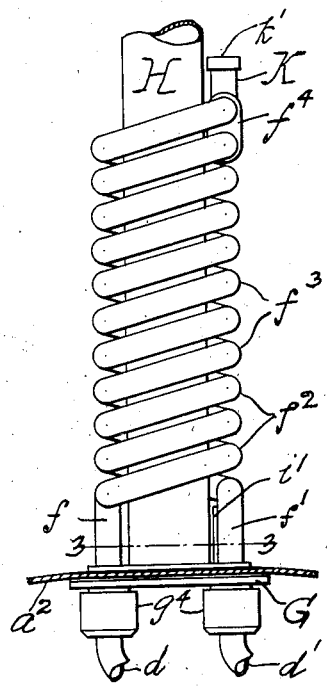
Fig. 2 is a fragmentary elevation of a part of the heating circuit or coil thereof.

In order to impart heat to the water contained in the tank or reservoir A, a continuous circuit for a body of liquid is provided, which circuit includes a part or element in which the body of liquid is subjected to heat, and another part or element contained within the reservoir A in which the heated liquid of the circuit delivers its heat to the water in the resevoir A. In the particular construction shown D represents the part of the circuit to which the heat is applied in any suitable manner, for example, from a gas burner E, and F represents the heat dissipating portion of the circuit, and which is arranged within the tank or reservoir A, both of these parts of the circuit as shown being in the form of coils of pipe or tubing, but it will be obvious that these parts of the circuit may be of other construction. The ends of the two coils or parts of the heating circuit are connected to form a complete circuit, the ends $d$, $d'$ of the heat receiving coil or element D being, in the construction shown, connected with the ends $f$, $f'$ of the heat dissipating coil or element F of the circuit. The circuit may contain liquid of any kind, but preferably water is employed so that the heating circuit may communicate directly with the supply of water in the reservoir A, so that the supply of water in the heating circuit will be maintained without requiring any attention. It will be obvious in examining Fig. 1 that thermo-siphon circulation in the coils D and F will be produced when heat is applied to the coil or element D, since the cold water flows through the portion $d'$ of the coil to the bottom of the coil D and the water in this coil on being heated flows upwardly through the portion $d$ of the coil and into the portion $f^2$ of the double spiral coil F, and after reaching the top of the coil the water is conducted to the other portion $f^3$ of the coil, see Fig. 2, by means of a connection $f^4$ between the upper ends of the two portions of the coil. The partly cooled water then flows downwardly in the portion $f^3$ of the coil F and thus finds its way down again to the bottom of the coil D. The heating of water in the coil D and the cooling thereof in the coil F set up a brisk circulation of the water in the two coils.

As the result of the construction described it will be obvious that the repeated circulation of the same liquid in the heating circuit will preclude the possibility of the formation of a scale, crust or other deposit in the heating circuit, which would interfere with the efficiency of the heater. The small amount of deposit or crust which might be formed from the amount of water originally supplied to the heating circuit is entirely imperceptible, and after this negligible amount of solid or suspended matter contained in this small amount of water has once been deposited, the further circulation of this water will form no deposit, scale or crust in the heating circuit. It has also been found that scale or crust does not form on any container which is not heated above the boiling point of water, and consequently no scale or crust forms on the outer surface of the heat transmitting portion F of the circuit. Any suspended matter in the water which is precipitated upon the heating of the water, will be deposited in the bottom of the reservoir A, where it will not interfere in any way with the efficiency of the heater and from where it may be readily withdrawn at any time by means of the usual drain pipe or faucet, not shown.

In the drawings is shown, by way of example, one form of water heater embodying this invention, but it will be understood that it is not intended to limit the invention to the particular construction shown in the drawings. The heater may, for example, be constructed in such a manner that the heating circuit can be readily positioned in or removed from the tank or reservoir A and for this purpose the two coils of the heating circuit are mounted on an annular base or support G which is preferably arranged in a hole in the lower header $a^2$ of the tank or reservoir A and which is provided with a central opening $g$ which may be threaded to receive the lower end of a flue pipe H through which the products of combustion from the burner A may pass upwardly through the tank or reservoir A, the flue pipe passing through a hole in the upper header $a'$ and may, if desired, terminate in a duct or passage $h$ for the products of combustion.

Preferably the flue H is also utilized to hold the annular supporting plate or base G in correct relation to the tank or reservoir A and for this purpose the base G is provided with an outwardly extending annular flange $g'$ which is adapted to seat against the underface of the lower header $a^2$ of the tank, and a washer or gasket $g^2$ of suitable packing material is interposed between the flange and the header or tank bottom $a^2$. In order to draw the annular base G against the under face of the bottom $a^2$ of the tank, a nut $h'$ is arranged near the upper end of the flue pipe H and engages with a thread on the outer face of the flue pipe and is adapted to be drawn against the upper face of the upper header $a'$, a packing washer or gasket $h^2$ being preferably interposed between the nut and the header. Consequently by simply tightening the nut $h'$, the flue H is secured in place as well as the annular base G and the parts carried thereby. Other means for securing the base G on the tank or reservoir A may obviously be employed without departing from this invention.

The annular base G is also provided in its body portion with a pair of holes extending vertically through the same and terminating in their lower ends in downwardly extending lugs or bosses $g^3$, which are adapted to cooperate with gland or packing nuts $g^4$, which serve to clamp the ends of the two parts of the heating circuit together and to the annular base G. The construction which is preferably employed is shown more in detail in Fig. 4 which shows the lower end of each lug or boss $g^3$ to be provided with an outwardly flaring bevelled inner face $g^5$, and a correspondingly and oppositely flaring face $g^6$ is provided on the inner portion of the nut $g^4$. The bevelled portions $g^5$ of the lugs or projections $g^3$ are adapted to cooperate with and form seats for the outwardly flared lower ends $g^7$ of the heat dissipating coil F, and the bevelled or inclined portions $g^6$ of the nuts $g^4$ are adapted to cooperate with flaring ends $g^8$ of the heat receiving coil D of the heating circuit, and a double tapered sleeve or collar $g^9$ is preferably placed so that the tapering ends thereof enter into the outwardly flaring ends of the coils, so that by tightening the nuts $g^3$ a very secure liquid tight joint can be formed. Any other suitable means for connecting the opposite ends of the two portions of the heating circuit may be provided.

As has been stated, means are preferably provided for permitting water to enter into the heating circuit from the tank or reservoir A, and these means also take care of the expansion and contraction of the water in the heating circuit, and for this purpose the following construction is preferably employed. The annular supporting member G is provided with a cored hole or opening I, which terminates at one end in the opening through which the pipe $f'$ passes, and at its other end in an upwardly extending threaded hole $i$ in which an upright tube $i'$ is secured. The tube or portion $f'$ of the coil or part F of the heating circuit is also provided with a suitable opening $i^2$ which registers with the cored hole I, see Fig. 5. Consequently the liquid contained within the heating circuit may pass through the hole or opening $i^2$ in the pipe $f'$, the cored hole I, and the upright pipe $i'$. This communication between the interior of the tank or reservoir A and the water in the heating circuit takes care of the expansion and contraction of the liquid in the heating circuit due to changes in temperature. Consequently when the liquid in the circuit is heated, the very slight expansion thereof takes place through the passage I and the upright pipe $i'$ and when the liquid in the circuit again cools, some of the liquid which has previously been forced into the passage $i'$ will be returned to the heating circuit. Furthermore by means of this arrangement, water flows into the heating circuit as soon as water is supplied to the tank or reservoir A. The pipe $i'$ is made of sufficient height to extend above any sediment or deposit which may be formed in the tank or reservoir A, and by providing a circuitous passage or connection between the heating circuit and the water in the tank, the circulation of water in the heating circuit will not cause circulation through the passages connecting the heating circuit and the tank, so that the water in the heating circuit is used repeatedly for heating the water in the tank and will not mix with the water in the tank. The arrangement described also has the advantage that it does not interfere with the assembly of the heating coils and the base G as a unit. Any other suitable means for providing communication between the heating circuit and the water in the tank may be provided, if desired.

Means are also provided for permitting the escape of air from the coil F of the heating unit, and for this purpose, in the construction shown, an air valve is provided in the connection $f^4$ between the two parts of the coil F. This air valve includes a body portion K having a hole extending into the connecting member $f^4$ and the upper end of this hole is closed by a ball $k$, Fig. 1, which normally closes this hole. A cover or cap $k'$ closes the upper end of the body portion of the valve and has an opening $k^2$ for the passage of the air. When the tank A is filled with water, any air contained in the coil F will raise the ball $k$ from its seat and thus escape, but the ball prevents any of the water in the heating circuit from passing through this valve.

I claim as my invention:—

1. A water heater including a container for the water to be heated, and a heating circuit in which water may circulate without mixing with the water in said container, said heating circuit including a portion arranged exterior to said container and to which heat is applied for heating the water in said circuit, a part arranged within said container and through which the heated water circulates and imparts its heat to the water in said container, means for mounting said circuit on said container and a passage in said mounting means connecting the interior of said circuit with said container and through which water may flow for filling said circuit and during expansion and contraction of the water in said circuit.

2. A water heater including a container for the water to be heated, a heating circuit in which water circulates for heating the water in said container and which includes a part in said container from which heat is transmitted to the water in said container and a part arranged below said container and which is subjected to a source of heat, a supporting base on which both parts of said heating circuit are mounted, means on said base for connecting the two parts of said circuit with each other, and means for detachably securing said supporting base to said container, whereby said parts of said circuit may be removed from said container as a unit by removing said supporting base therefrom.

3. A water heater including a container for the water to be heated, a heating circuit in which water circulates for heating the water in said container and which includes a part in said container from which heat is transmitted to the water in said container and a part arranged below said container and which is subjected to the heat of a burner, an annular base on which said parts of said circuit are mounted, and a flue also secured to said annular base and through which products of combustion pass from said burner and which extends through said container, and means for securing said flue to said container, which means, acting through said flue, secure said base to said container.

4. A water heater including a container for the water to be heated, and a heating circuit in which water may circulate without mixing with the water in said container, said heating circuit including a part arranged exterior to said container and to which heat is applied for heating the water in said circuit, a part arranged within said container and through which heated water circulates and imparts its heat to the water in said container, a support on which said two parts of said heating circuit are mounted and to which the inlet and outlet ends of said parts are secured, and means for mounting said support on said container in a position to hold said two parts of said heating circuit in operative relation to said container.

5. A water heater including a container for the water to be heated, a heating circuit including a part arranged within said container and a part arranged exterior to said container and adapted to be heated, each of said parts having inlet and outlet ends which are connected to form a continuous circuit through which water may circulate to impart heat to the water in said container, and a base on which said inlet and outlet ends of said two parts of said circuit are mounted and which is adapted to be secured to said container for holding said circuit in operative relation thereto.

6. A water heater including a reservoir for the water to be heated, a substantially closed circuit containing water, a portion of said circuit being subjected to a source of heat and another portion of said circuit being arranged in said reservoir to transmit heat imparted to the water in the circuit to the water in the reservoir, the water in said circuit being repeatedly circulated due to the heating and cooling of the water in different parts of the circuit, a supporting member on which said circuit is mounted and which is held in operative relation to said reservoir to hold said circuit in correct relation thereto, a passage in said support communicating with the interior of said circuit, and an upright pipe communicating with said passage and open at its upper end and arranged to extend above the bottom of the reservoir.

7. A water heater including a container for the water to be heated, and a heating circuit in which water may circulate without mixing with the water in said container, said heating circuit including a portion arranged exterior to said container and to which heat is applied for heating the water in said circuit, a part arranged within said container and through which the heated water circulates and imparts its heat to the water in said container, a supporting member to which the two parts of said circuit are secured and which is adapted to be secured to the bottom of said container to hold said circuit in operative relation thereto, and a passage including a pipe secured on said supporting member and extending above the bottom of said container and communicating with the interior of said circuit, and through which water may flow for filling said circuit and during the expansion and contraction of the water in said circuit.

8. In a liquid heater the combination of a reservoir for the liquid to be heated, a source of heat arranged below said reservoir, a flue extending through said reservoir, a substantially closed circuit in which water is adapted to circulate and including a portion arranged below said reservoir and adapted to be acted upon by said source of heat, and a portion arranged within said reservoir for transmitting heat imparted to the water in said circuit to the water in said reservoir, a supporting member on which the parts of said circuit are mounted, and a connection between said flue and said supporting member for securing said supporting member against the bottom of said reservoir for holding said circuit in operative relation thereto.

9. In a liquid heater the combination of a reservoir for the liquid to be heated, a source of heat arranged below said reservoir, a flue extending through said reservoir, a substantially closed circuit in which water is adapted to circulate and including a portion arranged below said reservoir and adapted to be acted upon by said source of heat, and a portion arranged within said reservoir for transmitting heat imparted to the water in said circuit to the water in said reservoir, an annular supporting member, the inner portion of which is provided with means for securing said flue thereto, means on said supporting member for securing said two portions of said circuit thereto to hold said circuit in operative relation to said reservoir and to hold said two portions of said circuit in operative relation to each other, and means cooperating with said flue for securing said supporting member to the bottom of said reservoir.

FRED W. BIRTCH.